(12) United States Patent
Simke et al.

(10) Patent No.: US 7,543,700 B2
(45) Date of Patent: Jun. 9, 2009

(54) DRIVE DRUM FOR A BELT CONVEYOR

(75) Inventors: Dietmar Simke, Cottbus (DE); Boris Rathmann, Cottbus (DE); Rüdiger Bude, Cottbus (DE); Gilbert Lilienthal, Cottbus (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 12/222,041

(22) Filed: Jul. 31, 2008

(65) Prior Publication Data

US 2008/0308392 A1 Dec. 18, 2008

Related U.S. Application Data

(63) Continuation of application No. PCT/EP2007/000543, filed on Jan. 23, 2007.

(30) Foreign Application Priority Data

Feb. 4, 2006 (DE) ........................ 10 2006 005 158

(51) Int. Cl.
*B65G 23/04* (2006.01)
(52) U.S. Cl. .................... 198/835; 198/788; 492/16; 492/46
(58) Field of Classification Search ................ 198/834, 198/835, 788, 789; 492/16, 46
See application file for complete search history.

(56) References Cited

U.S. PATENT DOCUMENTS

| 1,820,985 A | 9/1931 | McKee |
| 3,773,166 A * | 11/1973 | Nowacki .................... 198/835 |
| 4,728,840 A | 3/1988 | Newhouse |
| 5,077,876 A * | 1/1992 | McConkey ................. 29/27 R |

(Continued)

FOREIGN PATENT DOCUMENTS

DE 35 16 258 A1 11/1986

(Continued)

OTHER PUBLICATIONS

German Search Report.

(Continued)

*Primary Examiner*—James R Bidwell
(74) *Attorney, Agent, or Firm*—Buchanan Ingersoll & Rooney PC

(57) ABSTRACT

A drive drum is disclosed for a belt conveyor that gearlessly drives a conveyed product. For example, at least one motor is located inside the drum shell, said motor being fixed to the drum shell by means of a motor frame on the shell and to a fixed drum shaft by means of a fixed motor frame on said shaft; the drum shell is sealed on both sides by a base on the end face, said bases being provided with centric bearings that support the fixed drum shaft; the two ends of the fixed drum shaft are mounted on shaft fixings; at least one electric connection line, which extends inside or along the drum shaft, runs between a winding of the motor that is fixed to the fixed motor frame, on the shaft and an electric energy supply; the motor(s) has or have a cooling device for the winding; and a coolant supply and a coolant drain of the cooling device and/or a coolant connection line extend inside or along the drum shaft.

20 Claims, 13 Drawing Sheets

U.S. PATENT DOCUMENTS

| | | | |
|---|---|---|---|
| 7,329,215 B2 * | 2/2008 | Umeda | 198/788 |
| 7,362,016 B2 * | 4/2008 | Cheng | 310/52 |

FOREIGN PATENT DOCUMENTS

| | | |
|---|---|---|
| DE | 41 34 050 C2 | 4/1992 |
| DE | 36 35 297 C1 | 3/1993 |
| DE | 692 12 792 T2 | 1/1997 |
| DE | 196 14 936 A1 | 10/1997 |
| DE | 196 23 139 | 10/1997 |
| DE | 203 19 969 | 4/2004 |
| DE | 103 24 664 A1 | 12/2004 |
| DE | 103 37 529 A1 | 1/2005 |
| DE | 601 09 874 T2 | 3/2006 |
| EP | 0 623 988 A2 | 11/1994 |
| EP | 1 475 340 A | 11/2004 |
| GB | 904 258 A | 8/1962 |
| GB | 20401 730 A | 11/2004 |
| WO | WO 01/37398 A | 5/2001 |

OTHER PUBLICATIONS

PCT/ISA/210.

* cited by examiner

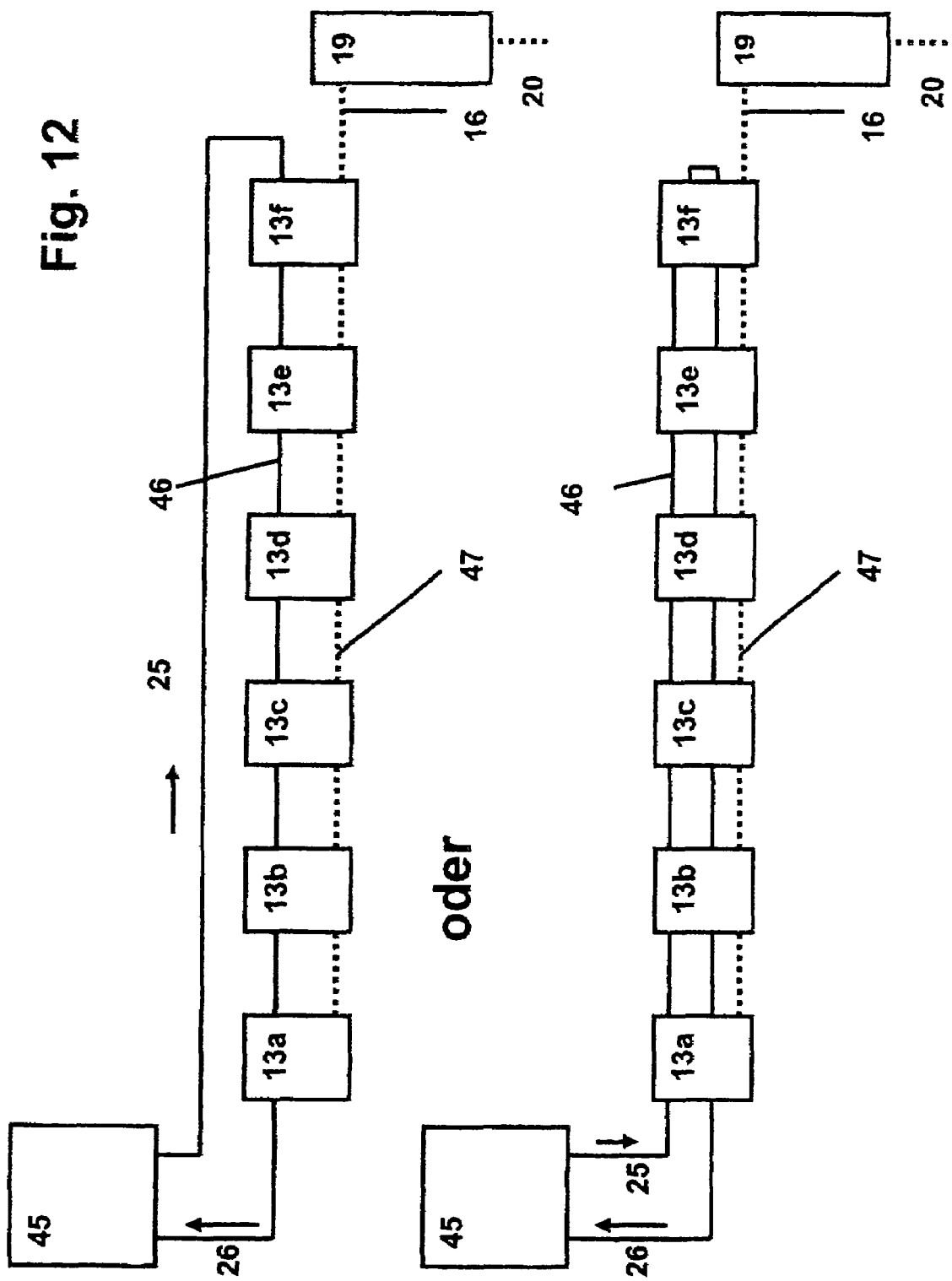

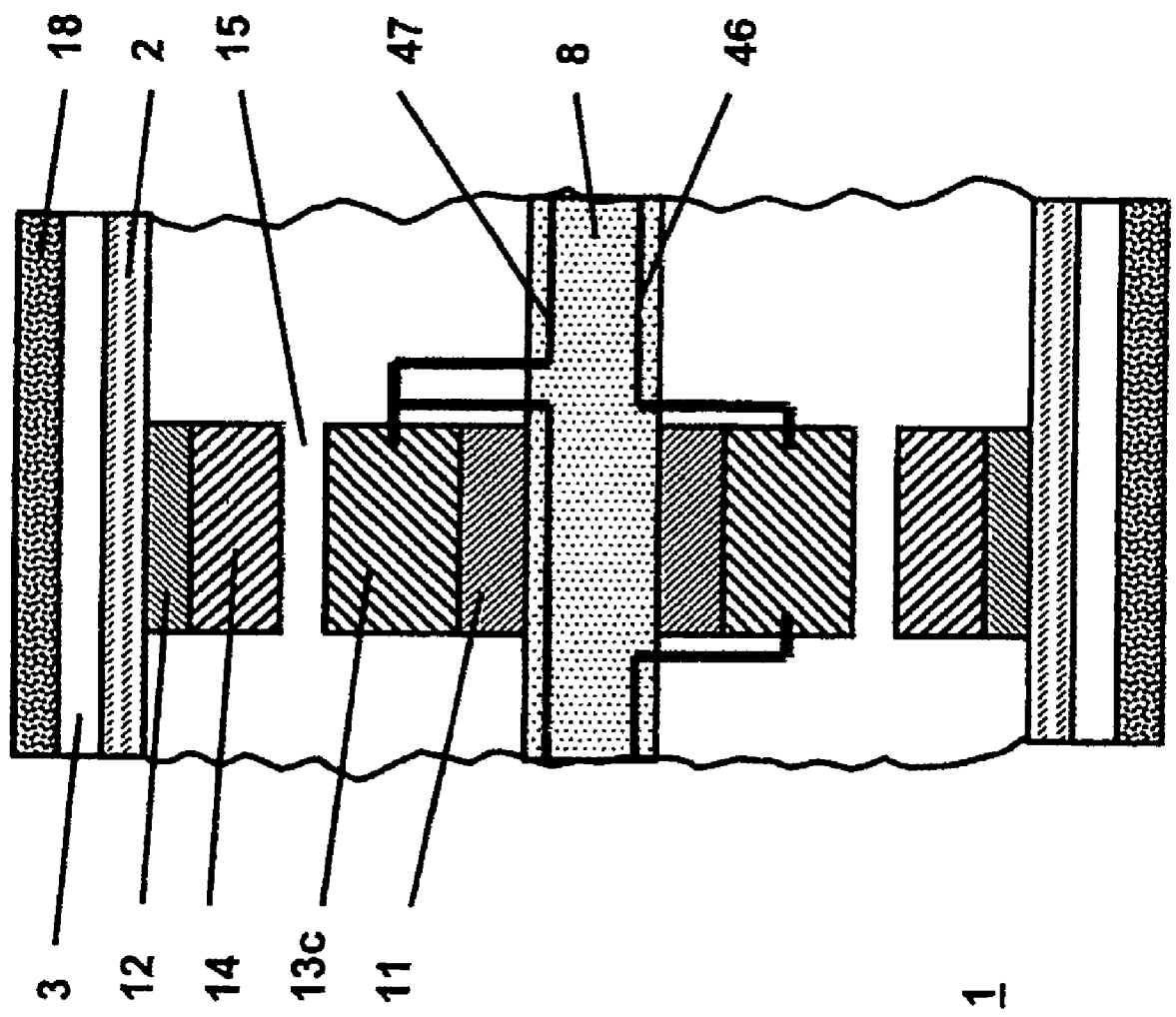

DRIVE DRUM FOR A BELT CONVEYOR

RELATED APPLICATIONS

This application claims priority under 35 U.S.C. §119 to German Application 10 2006 005 158.0 filed in Germany on Feb. 4, 2006, and as a continuation application under 35 U.S.C. §120 to PCT/EP2007/000543 filed as an International Application on Jan. 23, 2007 designating the U.S., the entire contents of which are hereby incorporated by reference in their entireties.

TECHNICAL FIELD

The disclosure relates to a drive drum of a belt and to a construction kit system for forming a drive drum. Belt conveyors are used industrially in the transportation of bulk goods, for example for conveying ores, coal and earth.

BACKGROUND INFORMATION

DE 41 34 050 C2 has disclosed a drive drum for belt conveyors with a motor and a gear mechanism positioned within the drum, the drive drum having, on both sides, fixed hollow shaft sections which protrude into the drum for removably accommodating the motor and gear mechanism mounted within the drum. The bearings are arranged between the hollow shaft sections, which have different lengths, and the drum. The motor and the gear mechanism are fastened in the longer hollow shaft section which has been provided at the one end with a supporting element. The proposed configuration makes it possible to quickly replace the motor and the gear mechanism without relieving the drum of tensile forces of the belt and without draining away any oil.

SUMMARY

A drive drum of a belt conveyor is disclosed which can be produced inexpensively for different power requirements. For example, a drive drum for a belt conveyor is disclosed for gearlessly driving a conveyor belt, at least one motor being arranged within the drum casing, which motor is fastened on the drum casing via a casing-side motor frame and is fastened on a fixed drum spindle via a fixed spindle-side motor frame, the drum casing being sealed at both ends by means of an end-side base, the bases being provided with centrally arranged bearings which are used for accommodating the fixed drum spindle, the two ends of the fixed base spindle being fitted using spindle fastenings, at least one electrical connecting line, which is routed within or on the drum spindle, runs between a winding, which is fastened on the fixed spindle-side motor frame, of the motor and an electrical power supply, and the at least one motor having a cooling apparatus for the winding, wherein a coolant feedline and a coolant discharge line of the cooling apparatus and/or a coolant connecting line are routed within or on the drum spindle.

In another aspect, a drive drum arrangement for gearlessly driving a conveyor belt is disclosed. The arrangement comprises: a drum casing, the drum casing being sealed at both ends using an end-side base, the bases being provided with centrally arranged bearings which are used for accommodating a fixed drum spindle; at least one motor being arranged within the drum casing, which motor is fastened on the drum casing via a drum covering motor frame and is fastened on the fixed drum spindle via a fixed spindle-side motor frame, the two ends of the fixed base spindle being fitted using spindle fastenings; an electrical power supply; at least one electrical connecting line, which is routed within or on the drum spindle, runs between a winding, which is fastened on the fixed spindle-side motor frame, of the motor and the electrical power supply, and a cooling apparatus for the winding, wherein a coolant feedline and a coolant discharge line of the cooling apparatus and/or a coolant connecting line are routed within or on the drum spindle.

A construction kit system for forming a drive drum is disclosed comprising drum casings of different lengths and/or different diameters, drum spindles of different lengths and/or different diameters, motors of different diameters and/or with different cooling systems, the motors being designed to be sufficiently narrow for at least two such motors to be capable of being inserted into the drum next to one another, wherein the drive drum can be assembled from these standard modules in an application-specific manner with respect to the required performance in terms of the required torque, the required rotation speed, the predetermined width of the conveyor belt and the desired manner of cooling.

BRIEF DESCRIPTION OF THE DRAWINGS

The disclosure will be explained below with reference to the exemplary embodiments illustrated in the drawings, in which:

FIGS. 12, 13 show a second possible schematic of the electrical connection technology and the coolant connection technology of the seventh exemplary embodiment.

DETAILED DESCRIPTION

The gearless drive proposed for belt conveyors can have a very robust design and can be manufactured inexpensively in different power classes. For example, depending on the power of the drive drum required, a different number of in each case identically designed motors can be used in one and the same drum casing.

Figure 1:
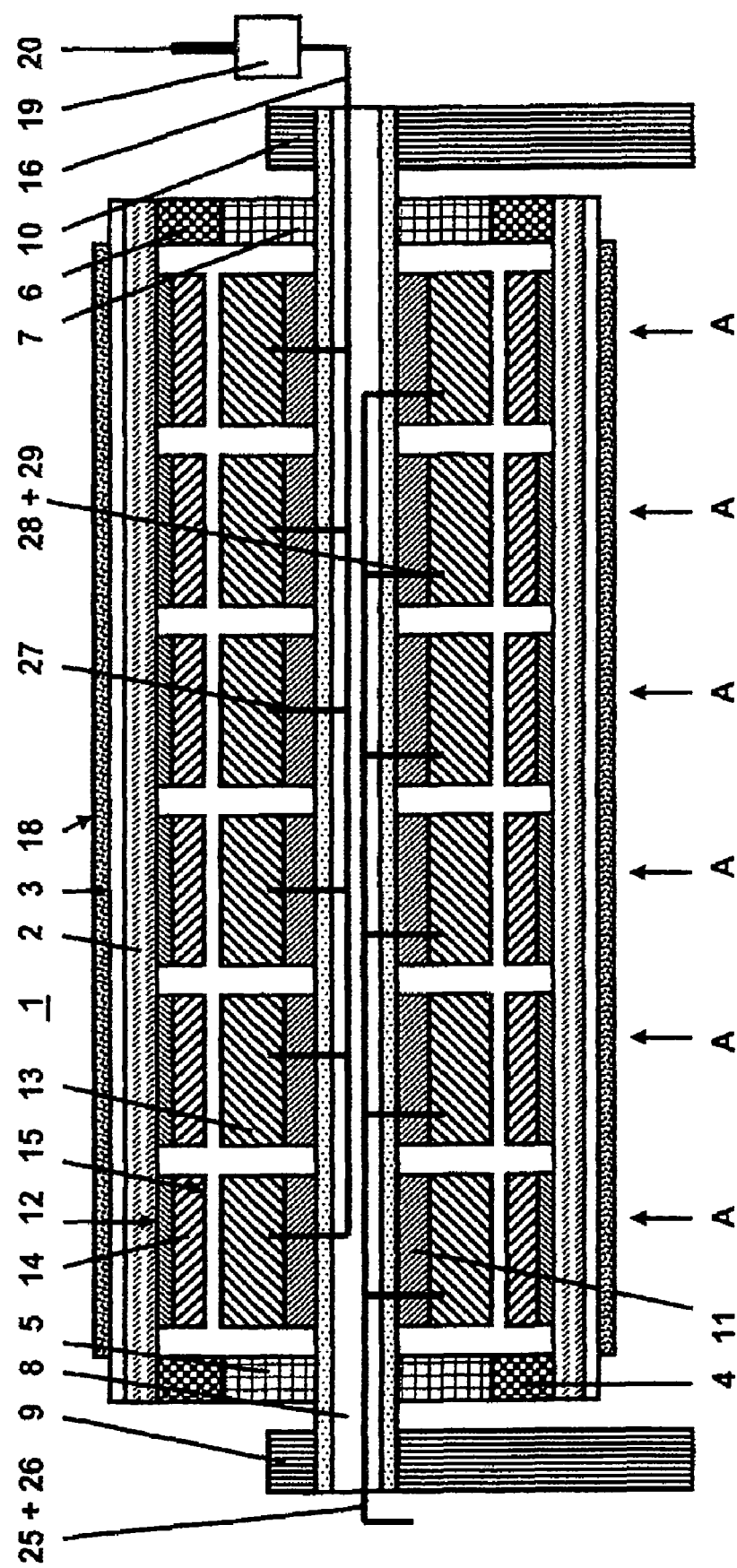
FIG. 1 shows a first exemplary embodiment of a drive drum of a belt conveyor in longitudinal section.

FIG. 1 illustrates a first exemplary embodiment of a drive drum of a belt conveyor in longitudinal section. The drive drum 1 has a hollow-cylindrical drum casing 2, which is coated with a drum covering 3 (for example a vulcanized-on rubber layer). A conveyor belt 18 is driven by the drive drum 1. The two end-side bases 4 and 6 of the drive drum 1 are provided with centrically arranged bearings 5 and 7, respectively, which are used for fitting a fixed drum spindle 8. The two ends of the drum spindle 8 which protrude beyond the bases 4, 6 are fitted in spindle fastenings 9, 10.

For example, six motors A are arranged within the hollow-cylindrical drum casing 2. The motors A can be synchronous motors with excitation using permanent magnets and with a cooling apparatus. No component parts which require feedlines for the supply of power or for cooling purposes are arranged on rotating parts. Each motor A

- is fastened on the drum spindle 8 via a spindle-side motor frame 11,
- is fastened on the drum casing 2 via a casing-side motor frame 12,
- has a winding 13, which is fastened on the spindle-side motor frame 11,
- has permanent magnets 14, which are fastened on the casing-side motor frame 12, as motor components for field generation,
- has an air gap 15 between the permanent magnets 14 and the winding 13,
- has a winding connection 27 for supplying power,
- has a winding coolant feedline 28 and a winding coolant discharge line 29.

The winding connections 27 are connected to at least one connecting line 16 for the supply of power (cable). This at least one connecting line 16 can run, for example, within the drum spindle 8. In order to be able to operate the motors at a variable rotation speed, a converter 19, e.g., a frequency converter, is provided which is connected on the input side to a power supply (mains) 20 and on the output side supplies the at least one connecting line 16.

The winding coolant feedlines 28 are connected to a coolant feedline 25, which is routed, for example, within the drum spindle 8. In the same way, the winding coolant discharge lines 29 are connected to a coolant discharge line 26, which is routed, for example, within the drum spindle 8. Depending on the type of coolant, the coolant feedline 25 and the coolant discharge line 26 may be connected to further components. When using a liquid (for example water or oil) as the coolant, a recooler and a coolant pump for coolant transport act as further components. When using a gas (for example air) as the coolant, a fan for coolant transport is used as the further component.

The abovementioned fastening of the motors between the spindle-side motor frame 11 and the drum spindle 8 and between the casing-side motor frame 12 and the drum 2 can take place via technologically customary form-fitting connections, for example feather keys or toothed formations, lateral stops being used to prevent lateral sliding of the motors. It is important here that the casing of the drum 2 is sufficiently stable in terms of the high tensile force of the belt occurring and the high belt weight (tangential forces), i.e. for the resulting bending to be in the desired tolerance range.

Figure 2:
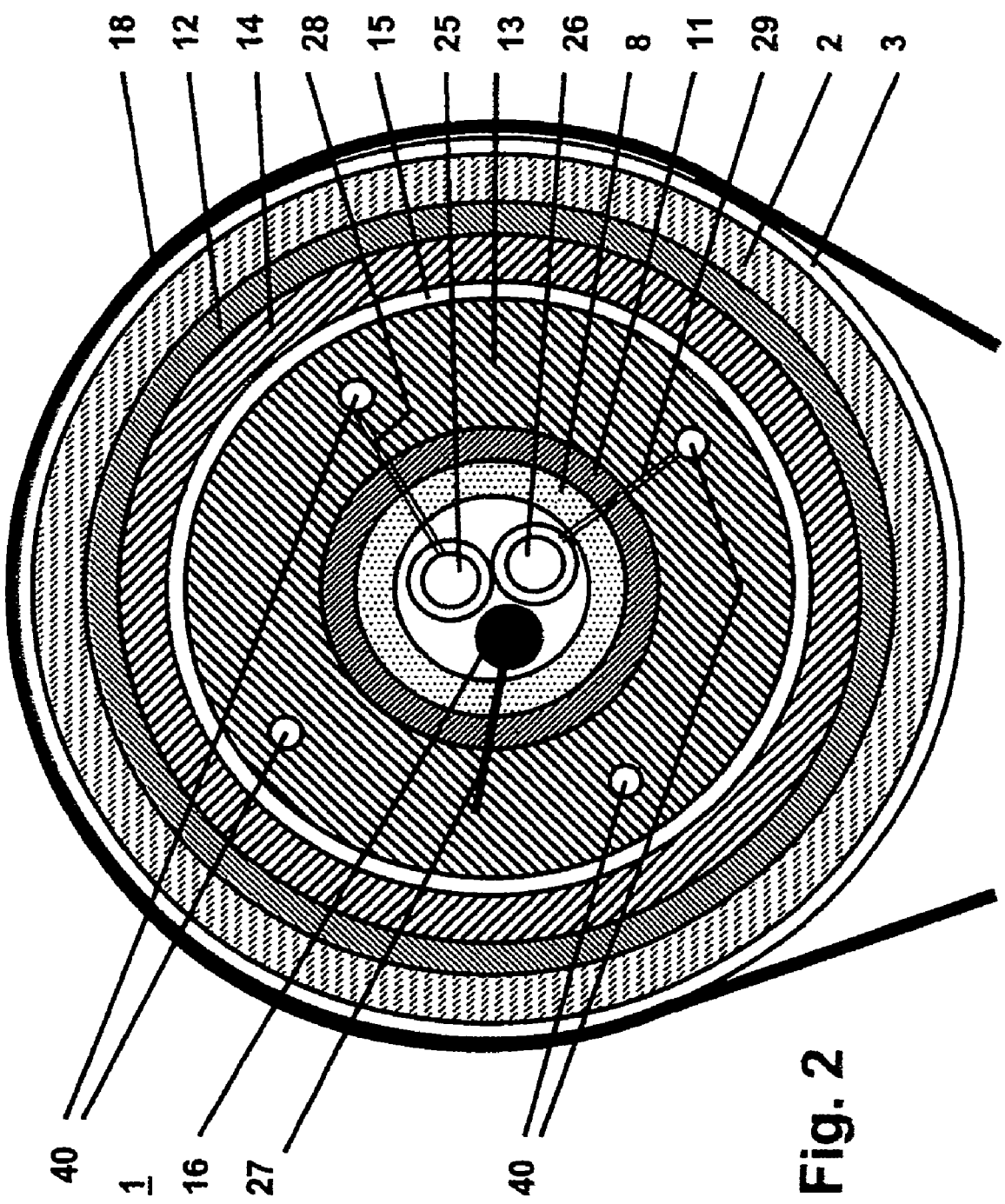
FIG. 2 shows a cross section through a drive drum of the first exemplary embodiment.

FIG. 2 illustrates a cross section through a drive drum 1 of the first exemplary embodiment, the drive spindle 8 being in the form of a hollow spindle. The at least one connecting line 16 for supplying power, the coolant feedline 25 and the coolant discharge line 26 run within the hollow drum spindle 8. The motor is formed by the spindle-side motor frame 11, the winding 13, the permanent magnets 14 and the casing-side motor frame 12, it being possible to identify the air gap 15 between the winding 13 and the permanent magnets 14. The electrical winding connection 27, the winding coolant feedline 28, which is connected to the coolant feedline 25, and the winding coolant discharge line 29, which is connected to the coolant discharge line 26, are shown in sketched form; the same for the drum casing 2 with the drum covering 3 and the driven conveyor belt 18 which is slung around the drive drum. For the guidance of the coolant, for example, a pipeline 40, which is connected to the coolant feedline 25 and the coolant discharge line 26, is laid within the winding 13 of a motor A.

Figure 3:
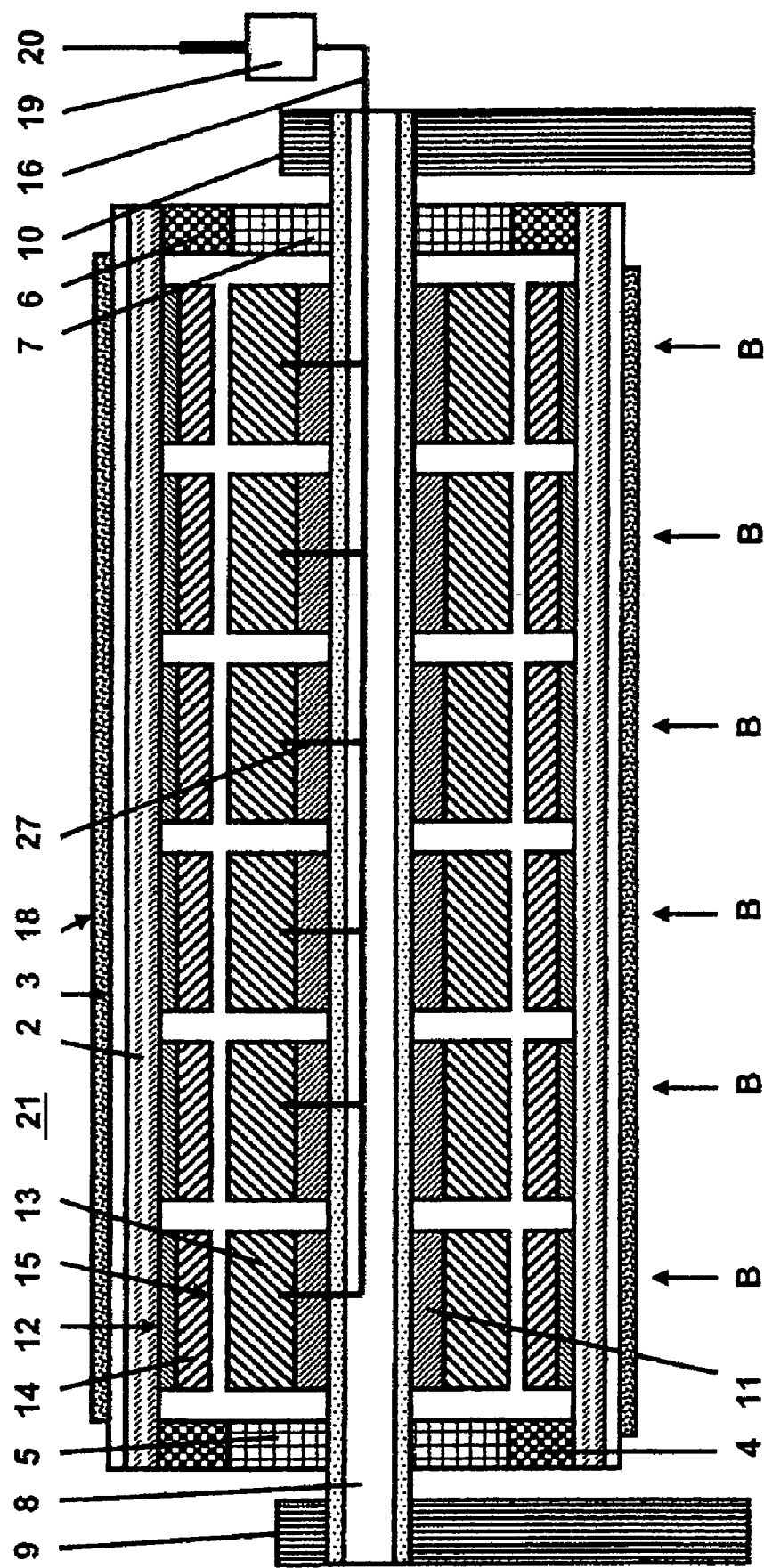
FIG. 3 shows a second exemplary embodiment of a drive drum of a belt conveyor in longitudinal section.

FIG. 3 illustrates a second exemplary embodiment of a drive drum of a belt conveyor in longitudinal section. In this second exemplary embodiment there is a reduced power requirement in comparison with the first exemplary embodiment. This exemplary embodiment differs from the first exemplary embodiment shown in FIGS. 1 and 2 in that six motors B without a cooling apparatus have been inserted in a drive drum 21. Accordingly, there is no need for the coolant feedline 25, the coolant discharge line 26, the winding coolant feedlines 28, the winding coolant discharge lines 29 and the pipelines 40.

Figure 4:
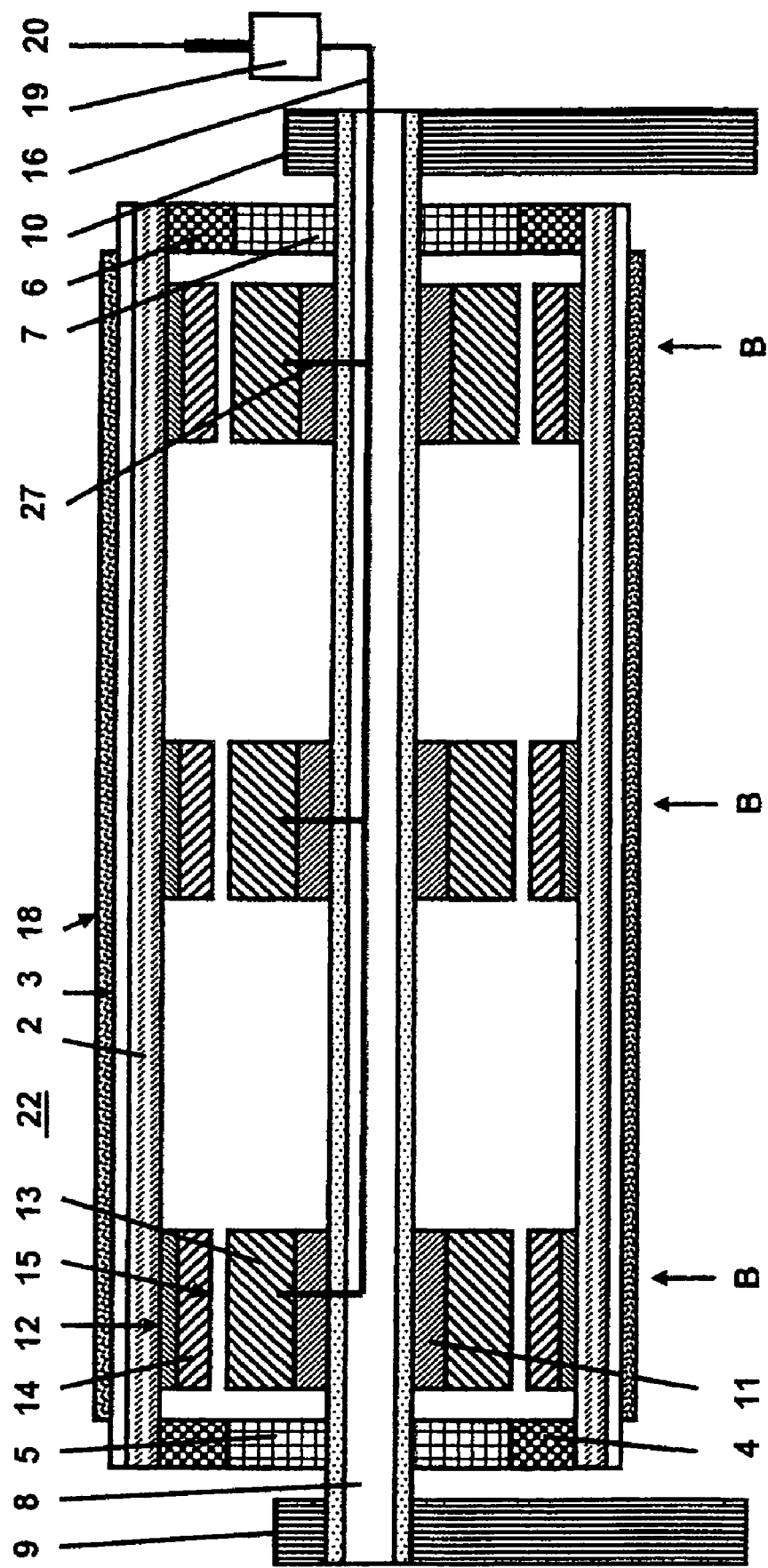
FIG. 4 shows a third exemplary embodiment of a drive drum of a belt conveyor in longitudinal section.

FIG. 4 illustrates a third exemplary embodiment of a drive drum of a belt conveyor in longitudinal section. In this third exemplary embodiment there is a reduced power requirement in comparison with the second exemplary embodiment. This exemplary embodiment differs from the second exemplary embodiment shown in FIG. 3 in that only three motors B without a cooling apparatus have been inserted in a drive drum 22. The arrangement of the motors B within the drum 2 can take place in symmetrical fashion at the edges and in the center of the drum.

Figure 5:
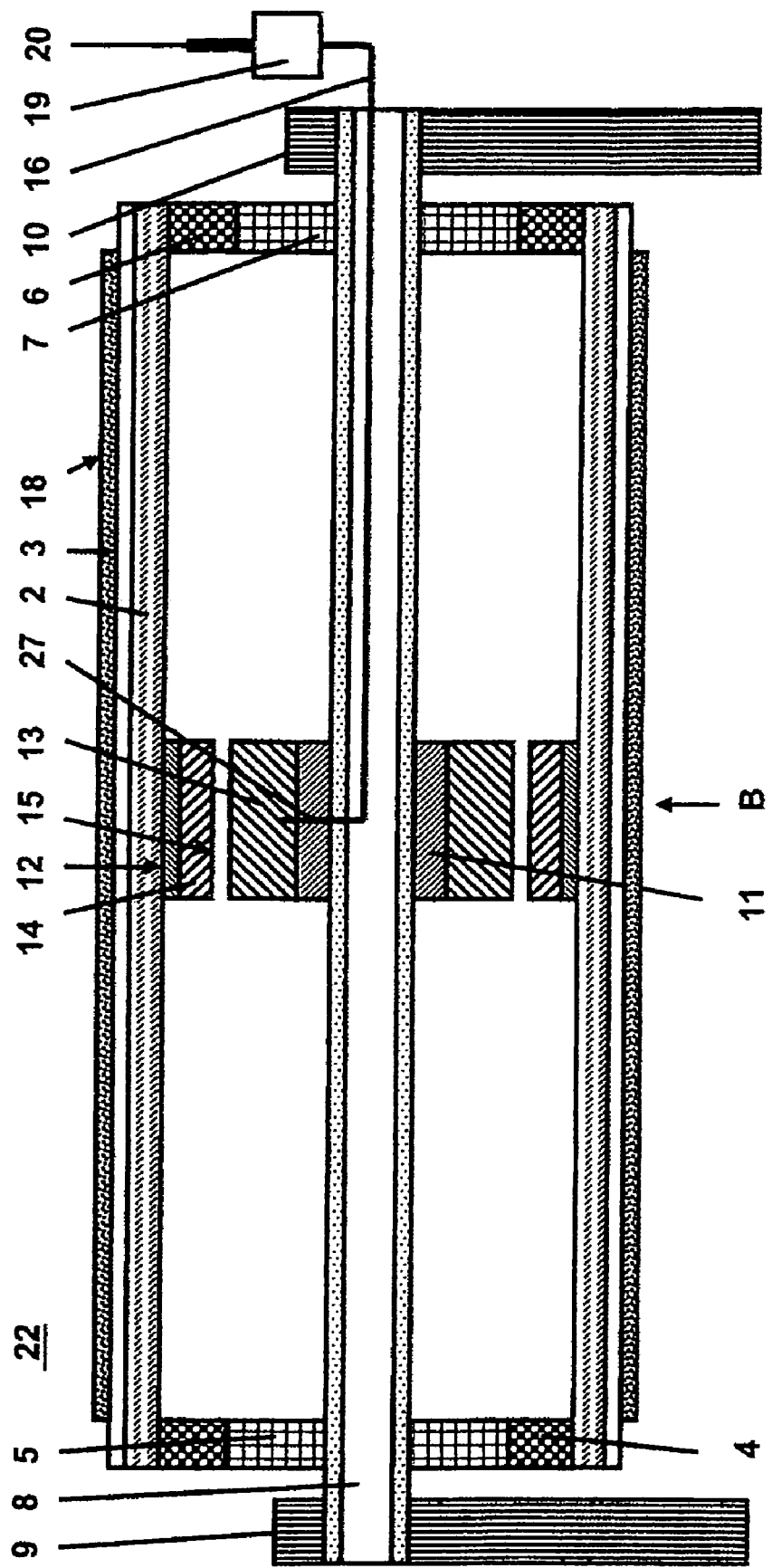
FIG. 5 shows a fourth exemplary embodiment of a drive drum of a belt conveyor in longitudinal section.

FIG. 5 illustrates a fourth exemplary embodiment of a drive drum of the belt conveyor in longitudinal section. In this fourth exemplary embodiment, there is a reduced power requirement in comparison with the third exemplary embodiment. This exemplary embodiment differs from the third exemplary embodiment shown in FIG. 3 in that only one motor B without a cooling apparatus has been inserted in a drive drum 22. The arrangement of the motor B within the drum casing 2 can take place in symmetrical fashion in the center of the drum.

Figure 6:
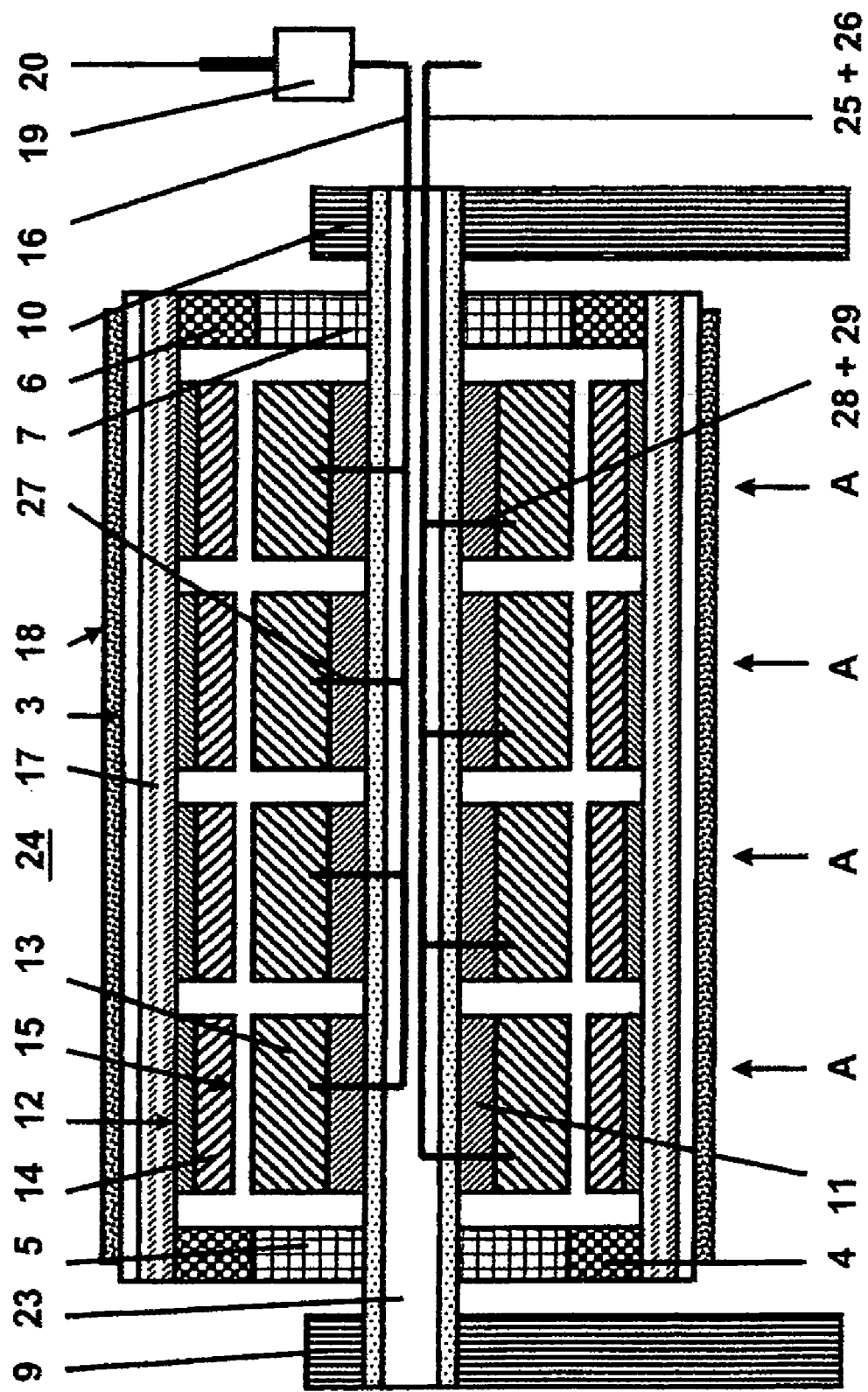
FIG. 6 shows a fifth exemplary embodiment of a drive drum of a belt conveyor in longitudinal section.

FIG. 6 illustrates a fifth exemplary embodiment of a drive drum of a belt conveyor in longitudinal section. In this fifth exemplary embodiment, a shorter drive drum 24 with a shorter drum casing 17 and a shorter drum spindle 23 is used in comparison with the first four exemplary embodiments. Four motors A with a cooling apparatus are used in the drive drum 24.

Figure 7:
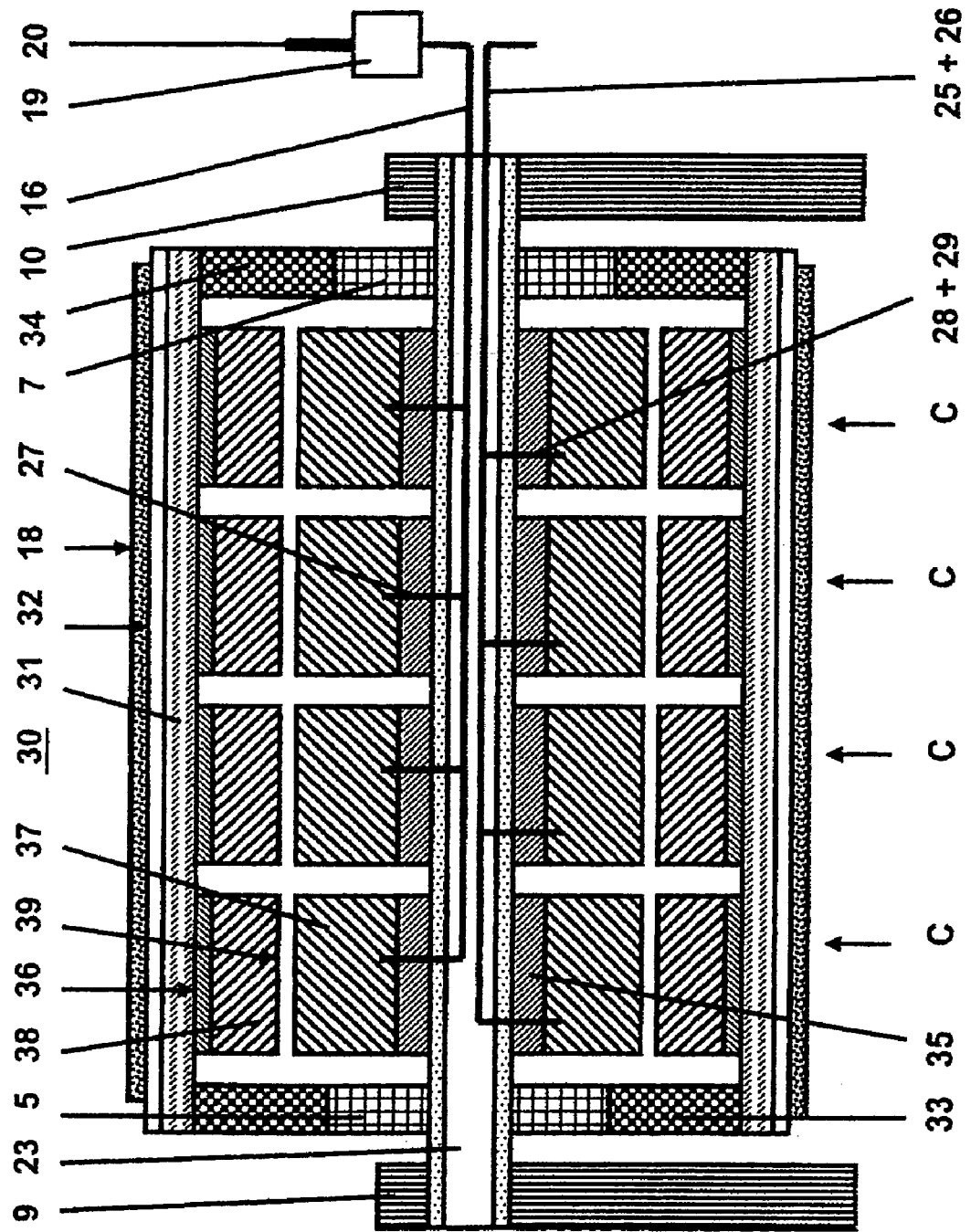
FIG. 7 shows a sixth exemplary embodiment of a drive drum of a belt conveyor in longitudinal section.

FIG. 7 illustrates a sixth exemplary embodiment of a drive drum of a belt conveyor in longitudinal section. In this sixth exemplary embodiment, a drive drum 30 with a drum casing 31 with an enlarged diameter is used in comparison with the first five exemplary embodiments, into which four motors C with a correspondingly enlarged diameter are inserted, which motors each have a spindle-side motor frame 35, a casing-side motor frame 36, a winding 37 and permanent magnet 38. The air gap 39 is shown. The figures show motors with a cooling apparatus, but it is of course also possible for these to be motors without a cooling apparatus. The drum casing 31 is sealed at both ends by end-side bases 33, 34 and is provided with a drum covering 32. The length of the drum casing 31 is equal to the length of the drum casing 17 in accordance with the fifth exemplary embodiment, with the result that the drum spindle 23 which is also used in the fifth exemplary embodiment can be used.

Figure 8:
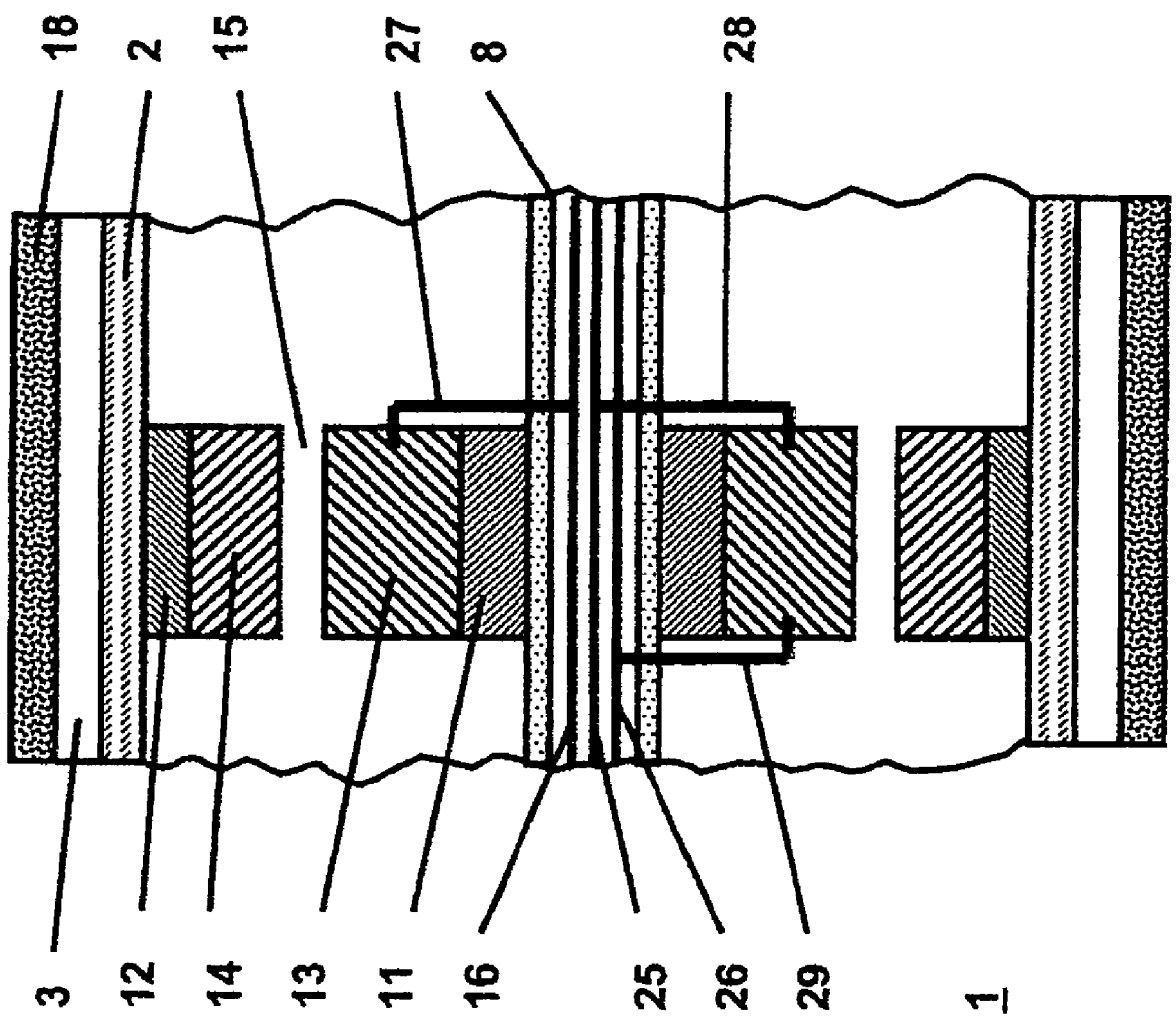
FIG. 8 shows an exemplary option for the electrical connection and the coolant connection of a winding.
Figure 9:
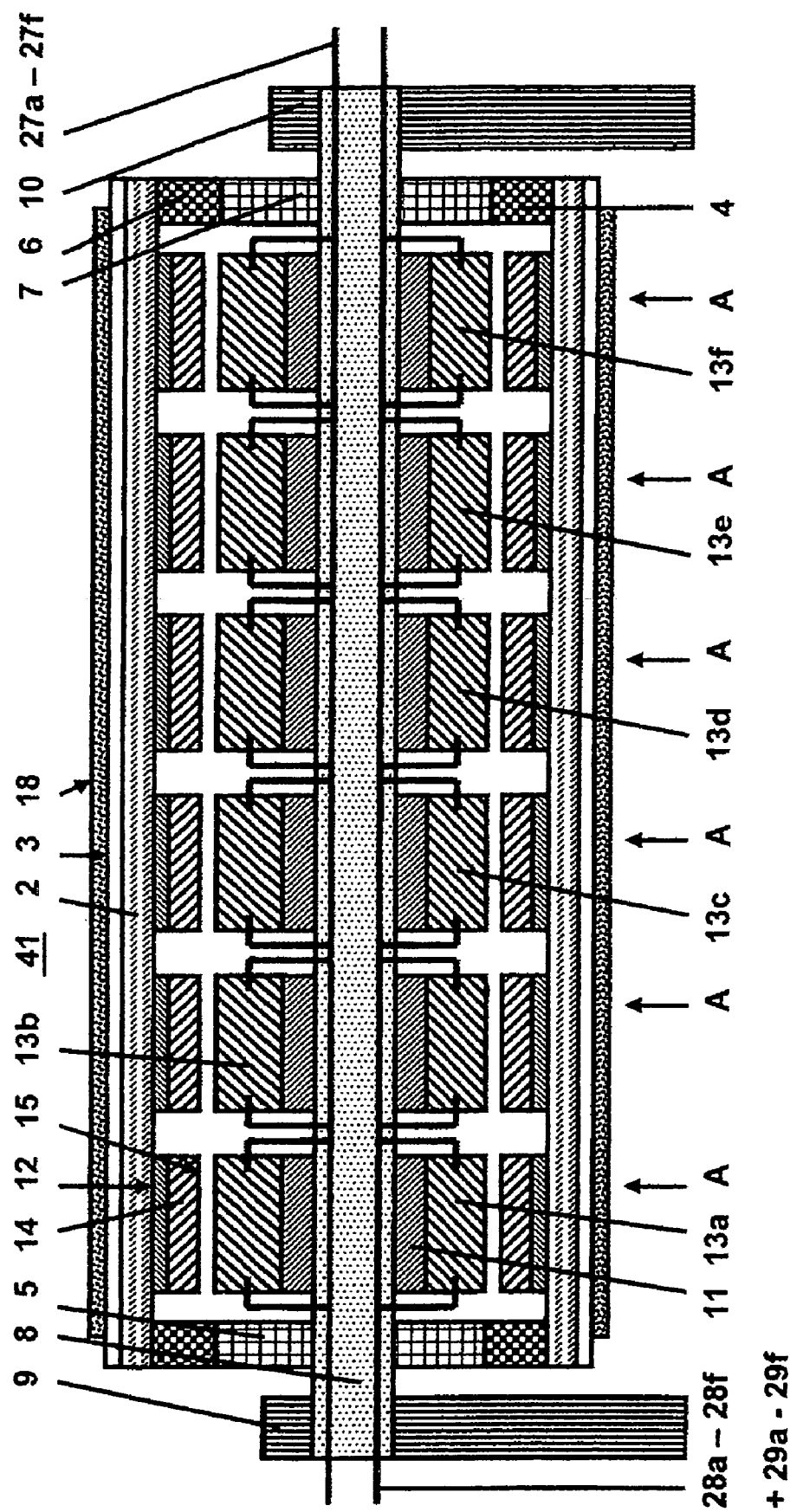
FIG. 9 shows a seventh exemplary embodiment of a drive drum of a belt conveyor in longitudinal section.
Figure 10:
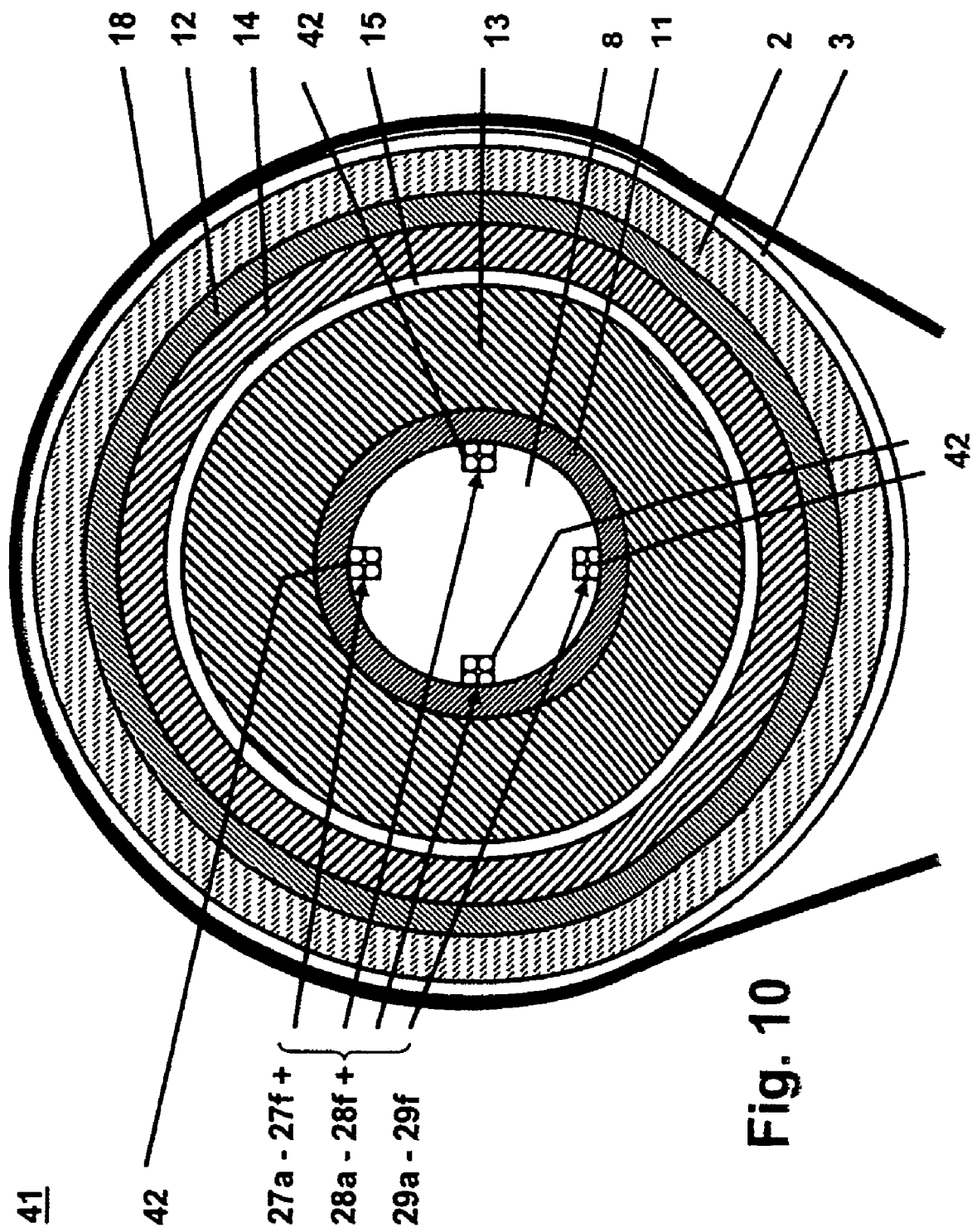
FIG. 10 shows a cross section through a drive drum of the seventh exemplary embodiment.

FIG. 8 illustrates an exemplary possibility for the electrical connection and the coolant connection of a winding as a schematic detailed sketch. The figure merely shows, by way of example, a motor arranged within the drive drum 1 (with the drum casing 2, the drum covering 3, the drum spindle 8) with the spindle-side motor frame 11, the casing-side motor frame 12, the winding 13, the permanent magnets 14, the air gap 15. The lines to/from the motors can be laid into the interspaces between the motors:

winding connection 27 between winding 13 and connecting line 16, winding coolant feedline 28 between winding 13 and coolant feedline 25, winding coolant discharge line 28 between winding 13 and coolant discharge line 26.

This displacement of the lines into the interspaces between the motors can result in a simplified construction and simplified assembly.

As is apparent from the explanations above, a "drive drum construction kit system" comprising different modules, such as standard drums of different lengths and different diameters, standard drum spindles of different lengths and/or diameters and standard motors of different diameters and with different cooling systems is formed which can be assembled in a corresponding manner for the specific application case. Since no special components need to be manufactured for a specific application case but standard components (modules) which can be produced in relatively high numbers can be used, the total production costs per drive drum and belt conveyor are reduced. The selection of the components is made in an application-specific manner taking into consideration the required power, the required torque, the required rotation speed, the predetermined width of the conveyor belt and the desired type of cooling (gas as coolant, liquid as coolant, without gas/liquid cooling). Even if only a single drum casing and a single drum spindle are used as the basis, a "drive drum construction kit system" results since a broad power spectrum can be covered depending on the number of motors used in this drum casing.

The use of a plurality of motors instead of a single motor results in the following:

the same motor can be used for different lengths of the drums (only the number of motors used is changed), which results in cost advantages, the air gap can be kept constant more easily over the entire length of the drum than the air gap of a single motor with a long length, the installation of a plurality of small motors into the drum is simpler than the installation of a single motor having a long length, standardization of the components is possible in a simple manner.

In addition to the above comments it should be mentioned that it is never necessary for the fixed components, such as the drum spindle 8, 23 and the spindle-side motor frame 11, for example, to have a cylindrical shape. The "first" component which absolutely must have a round cross section is the surface of the rotor of the motor on the air-gap side and the bearings 5, 7.

Furthermore, it is never necessary for the at least one connecting line 16 and/or the coolant feedline 25/coolant discharge line 26 to run within the drum spindle 8, 23. As an alternative to this, these lines can also be routed in another way in or on the drum spindle 8, 23, for example in grooves, which can simplify assembly and disassembly of the motors.

In this regard, FIGS. 9 to 13 illustrate a seventh exemplary embodiment of a drive drum of a belt conveyor in longitudinal section and cross section. In contrast to the first exemplary embodiment shown in FIG. 1, the drum spindle 8 is designed to be solid and has a plurality of longitudinal grooves 42 which are accessible from the casing surface and in which the (electrical) winding connections 27 or 27a-27f and/or electrical connecting lines 47, the winding coolant feedlines 28 or 28a-28f and the winding coolant discharge lines 29 or 29a-29f for the windings 13a-13f and/or coolant connecting lines 47 are routed. As has already been mentioned in connection with FIG. 8, the lines directly to/from the motors are laid in each case into the interspaces between the motors A or between the motor A and the end-side base/bearing.

Figure 11:
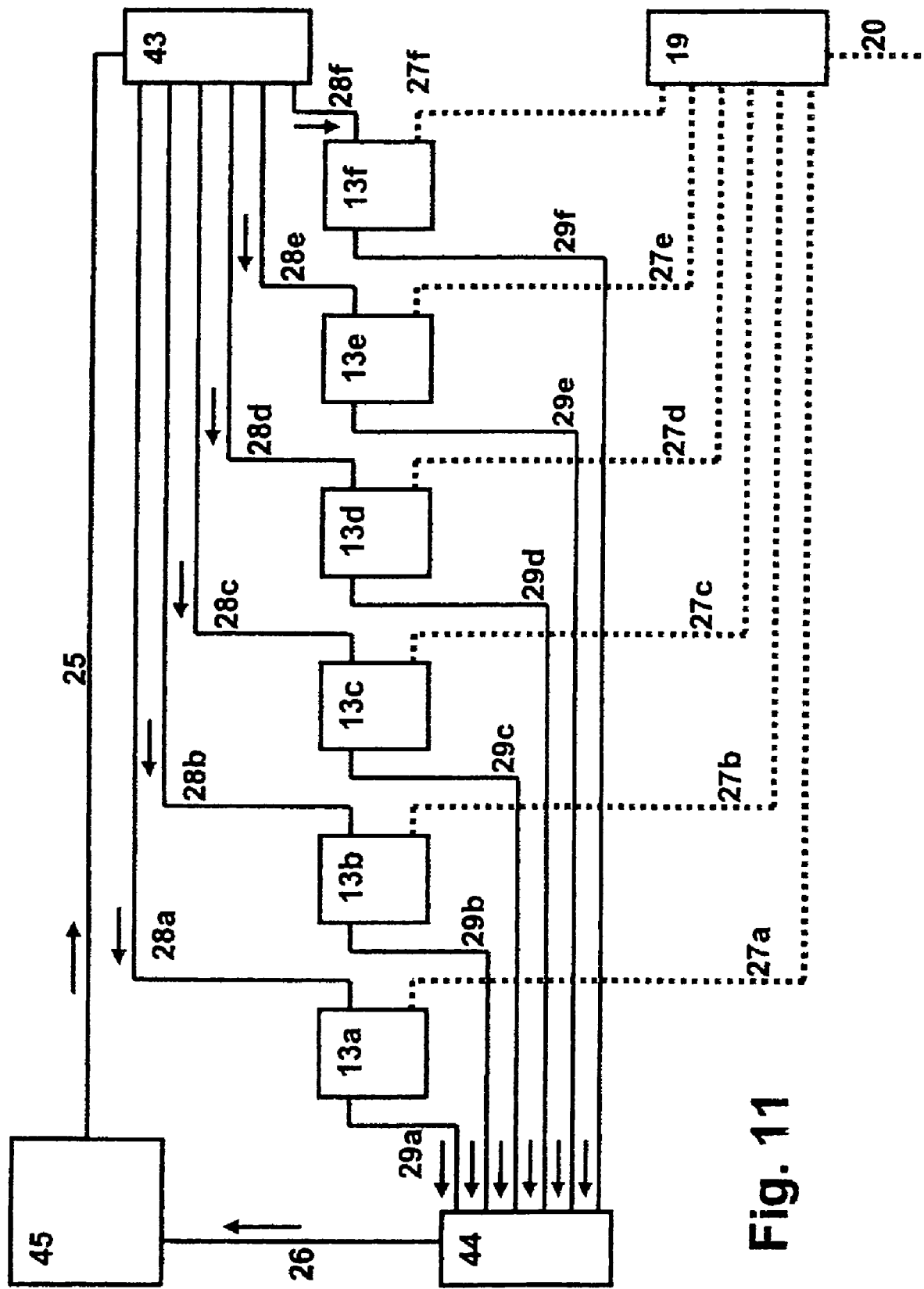
FIG. 11 shows a first possible schematic of the electrical connection technology and the coolant connection technology of the seventh exemplary embodiment.

FIG. 11 shows a first possible schematic of the electrical connection technology and the coolant connection technology for the seventh exemplary embodiment. In order to avoid any branch-off points in connection with the coolant feed and discharge within the drive drum 41, a coolant distributer 43 and a coolant accumulator 44 are provided outside the drive drum 41 and connected to a recooler 45. The following coolant cycle for the exemplary embodiment shown in FIG. 9 results: recooler 45—coolant feedline 25 (outside the drive drum)—coolant distributor 43—six separate (parallel) winding coolant feedlines 28a to 28f to the six windings 13a to 13f (within the drive drum)—coolant lines within these windings—six separate (parallel) winding coolant discharge lines 29a to 29f (within the drive drum)—coolant accumulator 44—coolant discharge line 26 (outside the drive drum)—recooler 45.

Furthermore, any branch-off points in connection with the electrical connections within the drive drum 41 are avoided. The converter 19, which is connected on the input side to the power supply 20, is connected to the individual windings 13a to 13f via separate winding connections 27a to 27f. The winding connections 27a to 27f in this case run within the grooves 42, as do the winding coolant feedlines 28a to 28f and the winding coolant discharge lines 29a-29f.

The further exemplary embodiment corresponds to the first exemplary embodiment. In the exemplary embodiment shown in FIG. 10, four symmetrically arranged grooves 42 which are each accessible from the casing surface are shown. Of course it is also possible for more than or fewer than four grooves to be provided. It is alternatively possible to guide only the winding connections 27 and/or the electrical connecting lines 47 (see FIGS. 12 and 13) or only the coolant feedlines 28 or only the coolant discharge lines 29 or coolant feedlines 28 and coolant discharge lines 29 or only coolant connecting lines 46 (see FIGS. 12 and 13) or coolant feedlines 28 and coolant discharge line 29 or coolant connecting lines 46 and winding connections 27 or electrical connecting lines 47 in one groove 42.

FIGS. 12 and 13 show a second possible schematic of the electrical connection technology and the coolant connection technology for the seventh exemplary embodiment. While a strictly parallel circuit of coolant lines and also electrical lines to the individual windings is realized in FIG. 11, in FIG. 12 a series circuit of the coolant lines is used. A coolant connecting line 46 and an electrical connecting line 47 are provided in each case between two windings, these lines running in grooves 42.

FIG. 12 shows two possible cooling cycle variants. In the first variant shown in the upper region of the drawing there is the following coolant cycle: recooler 45—coolant feedline 25 (can likewise run in a groove 42)—winding 13f—coolant connecting line 46—winding 13e—coolant connecting line 46—winding 13d—coolant connecting line 46—winding 13c—coolant connecting line 46—winding 13b—coolant connecting line 46—winding 13a—coolant discharge line 26—recooler 45

In the second variant shown in the lower region of the drawing the following coolant cycle results: recooler 45—coolant feedline 25—winding 13a—coolant connecting line 46—winding 13b—coolant connecting line 46—winding 13c—coolant connecting line 46—winding 13d—coolant connecting line 46—winding 13e—coolant connecting line 46—winding 13f—coolant connecting line 46—winding 13e—coolant connecting line 46—winding 13d—coolant connecting line 46—winding 13c—coolant connecting line 46—winding 13b—coolant connecting line 46—winding 13a—coolant discharge line 26—recooler 45.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1 drive drum of a belt conveyor
2 drum casing
3 drum covering
4 end-side base
5 bearing
6 end-side base
7 bearing
8 drum spindle
9 spindle fastening
10 spindle fastening
11 spindle-side motor frame
12 casing-side motor frame
13 13a-13f winding
14 permanent magnets
15 air gap
16 connecting line
17 drum casing
18 conveyor belt
19 converter
20 power supply
21 drive drum
22 drive drum
23 drum spindle
24 drive drum
25 coolant feedline
26 coolant discharge line
27 27a-27f winding connection
28 28a-28f winding coolant feedline
29 29a-29f winding coolant discharge line
30 drive drum
31 drum casing
32 drum covering
33 end-side base
34 end-side base
35 spindle-side motor frame
36 casing-side motor frame
37 winding
38 permanent magnets
39 air gap
40 pipeline
41 drive drum
42 grooves
43 coolant distributer
44 coolant accumulator
45 recooler
46 coolant connecting line
47 electrical connecting line A motor (synchronous motor with excitation using permanent magnets) with cooling apparatus
B motor (synchronous motor with excitation using permanent magnets) without cooling apparatus
C motor (synchronous motor with excitation using permanent magnets) with cooling apparatus

What is claimed is:

1. A drive drum for a belt conveyor for gearlessly driving a conveyor belt,
    at least one motor being arranged within a drum casing, which motor is fastened on the drum casing via a casing-side motor frame and is fastened on a fixed drum spindle via a fixed spindle-side motor frame,
    the drum casing being sealed at both ends by means of an end-side base, the bases being provided with centrally arranged bearings which are used for accommodating the fixed drum spindle,
    the two ends of the fixed base spindle being fitted using spindle fastenings,
    at least one electrical connecting line, which is routed within or on the drum spindle, runs between a winding, which is fastened on the fixed spindle-side motor frame, of the motor and an electrical power supply,
    and the at least one motor having a cooling apparatus for the winding, wherein
    a coolant feedline and a coolant discharge line of the cooling apparatus and/or a coolant connecting line are routed within or on the drum spindle.

2. The drive drum as claimed in claim 1, wherein for each motor a separate electrical connecting line is routed within or on the drum spindle.

3. The drive drum as claimed in claim 1, wherein for each motor a separate coolant feedline is routed within or on the drum spindle.

4. The drive drum as claimed in claim 1, wherein for each motor a separate coolant discharge line is routed within or on the drum spindle.

5. The drive drum as claimed in claim 1, wherein in each case between two motors a coolant connecting line is routed within or on the drum spindle.

6. The drive drum as claimed in claim 1, wherein in each case between two motors an electrical connecting line is routed within or on the drum spindle.

7. The drive drum as claimed in claim 1, wherein in order to guide the electrical connecting line and/or the electrical connecting line and/or the coolant feedline and/or the coolant discharge line and/or the coolant connecting line, grooves which are accessible from the casing surface are provided on the drum spindle.

8. The drive drum as claimed in claim 1, wherein the at least one motor is in the form of a synchronous motor with excitation using permanent magnets, the permanent magnets being fastened on the casing-side motor frame.

9. The drive drum as claimed in claim 1, wherein the fastening of the at least one motor takes place between the motor frames and the drum spindle respectively of the drum casing via form-fitting connections, such as feather keys or toothed formations, lateral stops being provided to prevent lateral sliding.

10. The drive drum as claimed in claim 1, wherein the drum casing is coated with a drum covering.

11. The drive drum as claimed in claim 1, wherein the electrical power supply of the at least one motor takes place via a converter or a frequency converter.

12. The drive drum as claimed in claim 2, wherein for each motor a separate coolant feedline is routed within or on the drum spindle.

13. The drive drum as claimed in claim 3, wherein for each motor a separate coolant discharge line is routed within or on the drum spindle.

14. The drive drum as claimed in claim 6, wherein in order to guide the electrical connecting line and/or the electrical connecting line and/or the coolant feedline and/or the coolant discharge line and/or the coolant connecting line, grooves which are accessible from the casing surface are provided on the drum spindle.

15. The drive drum as claimed in claim 7, wherein the at least one motor is in the form of a synchronous motor with excitation using permanent magnets, the permanent magnets being fastened on the casing-side motor frame.

16. The drive drum as claimed in claim 8, wherein the fastening of the at least one motor takes place between the motor frames and the drum spindle respectively of the drum casing via form-fitting connections, such as feather keys or toothed formations, lateral stops being provided to prevent lateral sliding.

17. The drive drum as claimed in claim 9, wherein the drum casing is coated with a drum covering.

18. The drive drum as claimed in claim 10, wherein the electrical power supply of the at least one motor takes place via a converter or a frequency converter.

19. A construction kit system for forming a drive drum comprising:
   drum casings of different lengths and/or different diameters:
   drum spindles of different lengths and/or different diameters: and
   motors of different diameters and/or with different cooling systems, the motors being designed to be sufficiently narrow for at least two such motors to be capable of being inserted into the drum next to one another,
   wherein the drive drum can be assembled from these standard modules in an application-specific manner with respect to the required performance in terms of the required torque, the required rotation speed, the predetermined width of the conveyor belt and the desired manner of cooling.

20. A drive drum arrangement for gearlessly driving a conveyor belt, the arrangement comprising:
   a drum casing, the drum casing being sealed at both ends using an end-side base, the bases being provided with centrally arranged bearings which are used for accommodating a fixed drum spindle;
   at least one motor being arranged within the drum casing, which motor is fastened on the drum casing via a casing-side motor frame and is fastened on the fixed drum spindle via a fixed spindle-side motor frame, the two ends of the fixed base spindle being fitted using spindle fastenings;
   an electrical power supply;
   at least one electrical connecting line, which is routed within or on the drum spindle, runs between a winding, which is fastened on the fixed spindle-side motor frame, of the motor and the electrical power supply, and
   a cooling apparatus for the winding, wherein a coolant feedline and a coolant discharge line of the cooling apparatus and/or a coolant connecting line are routed within or on the drum spindle.

* * * * *